(12) United States Patent
Goel et al.

(10) Patent No.: US 8,386,834 B1
(45) Date of Patent: Feb. 26, 2013

(54) RAID STORAGE CONFIGURATION FOR CACHED DATA STORAGE

(75) Inventors: Atul Goel, San Jose, CA (US); Stephen H. Strange, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 102 days.

(21) Appl. No.: 12/772,006

(22) Filed: Apr. 30, 2010

(51) Int. Cl.
*G06F 11/00* (2006.01)

(52) U.S. Cl. .......................... 714/6.1; 714/6.22

(58) Field of Classification Search ................ 714/6.1, 714/6.22
See application file for complete search history.

(56) References Cited

U.S. PATENT DOCUMENTS

| | | | | | |
|---|---|---|---|---|---|
| 4,425,615 | A | * | 1/1984 | Swenson et al. | 711/114 |
| 5,596,709 | A | * | 1/1997 | Bond et al. | 714/6.32 |
| 5,629,950 | A | * | 5/1997 | Godiwala et al. | 714/805 |
| 6,243,827 | B1 | * | 6/2001 | Renner, Jr. | 714/6.12 |
| 6,741,561 | B1 | * | 5/2004 | Lee | 370/230 |
| 7,313,749 | B2 | * | 12/2007 | Nerl et al. | 714/764 |
| 7,461,101 | B2 | * | 12/2008 | Hsu et al. | 1/1 |
| 7,523,257 | B2 | * | 4/2009 | Horn et al. | 711/114 |
| 7,793,146 | B1 | * | 9/2010 | Gibson et al. | 714/6.13 |
| 7,890,795 | B1 | * | 2/2011 | Madnani et al. | 714/6.2 |
| 8,024,525 | B2 | * | 9/2011 | Willis et al. | 711/135 |
| 2003/0233611 | A1 | * | 12/2003 | Humlicek et al. | 714/763 |
| 2005/0114728 | A1 | * | 5/2005 | Aizawa et al. | 714/6 |
| 2005/0188249 | A1 | * | 8/2005 | Hart et al. | 714/5 |
| 2006/0031708 | A1 | * | 2/2006 | Desai | 714/5 |
| 2006/0117216 | A1 | * | 6/2006 | Ikeuchi et al. | 714/6 |
| 2006/0174156 | A1 | * | 8/2006 | Balasubramanian | 714/6 |
| 2006/0218362 | A1 | * | 9/2006 | McManis | 711/162 |
| 2006/0282700 | A1 | * | 12/2006 | Cavallo | 714/6 |
| 2007/0220313 | A1 | * | 9/2007 | Katsuragi et al. | 714/6 |
| 2007/0260820 | A1 | * | 11/2007 | Qureshi et al. | 711/141 |
| 2008/0010503 | A1 | * | 1/2008 | Cashman | 714/6 |
| 2008/0065933 | A1 | * | 3/2008 | Thayer | 714/42 |
| 2008/0256420 | A1 | * | 10/2008 | Hafner et al. | 714/770 |
| 2008/0307268 | A1 | * | 12/2008 | Azevedo et al. | 714/42 |
| 2009/0037656 | A1 | * | 2/2009 | Suetsugu et al. | 711/114 |
| 2009/0055682 | A1 | * | 2/2009 | Gibson et al. | 714/6 |
| 2009/0063898 | A1 | * | 3/2009 | Eisen et al. | 714/12 |
| 2009/0199042 | A1 | * | 8/2009 | Ishikawa et al. | 714/7 |
| 2009/0300309 | A1 | * | 12/2009 | Miyachi et al. | 711/165 |
| 2010/0199041 | A1 | * | 8/2010 | Schnapp et al. | 711/114 |
| 2011/0145633 | A1 | * | 6/2011 | Dickens et al. | 714/6.1 |

* cited by examiner

*Primary Examiner* — Loan L. T. Truong
(74) *Attorney, Agent, or Firm* — Blakely, Sokoloff, Taylor & Zafman LLP

(57) ABSTRACT

A storage server receives a notification indicating a failure of a mass storage device in a storage array. The storage server determines whether a number of failures exceeds a fault tolerance level of the array and if the number of failures exceeds the fault tolerance level, recovers an address space corresponding to the failed storage device. When recovering the address space, the storage server replaces the failed storage device with a spare storage device having an identifiable pattern stored thereon and determines whether a file system on the storage system can automatically invalidate cached data blocks on the failed storage device.

7 Claims, 9 Drawing Sheets

RAID STORAGE CONFIGURATION FOR CACHED DATA STORAGE

RELATED APPLICATIONS

This application is related to U.S. application Ser. No. 12/629,032 filed on Dec. 1, 2009, which is assigned to the same assignee as the present application.

TECHNICAL FIELD

This invention relates to the field of data storage systems and, in particular, to a RAID storage configuration for cached data storage.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system can include at least one storage system, which is a processing system configured to store and retrieve data on behalf of one or more storage client processing systems ("clients"). In the context of NAS, a storage system operates on behalf of one or more clients to store and manage shared data containers in a set of mass storage devices, such as magnetic or optical disks or tapes, or flash drives. The data containers may include files, LUNs, or other units of storage. The mass storage devices may be organized into one or more volumes of a Redundant Array of Inexpensive Disks (RAID). In a SAN context, the storage server provides clients with block-level access to stored data, rather than file-level access. Some storage servers are capable of providing clients with both file-level access and block-level access.

RAID configurations are typically used to organize an array of mass storage devices, such as hard disk drives (HDDs), which serve as the primary data storage for a storage system. A RAID group may be configured using various fault-tolerance levels, such as for example, RAID-0, RAID-1, RAID-4, RAID-5 or RAID-DP™ depending on the performance and reliability characteristics of the system. Each of these RAID levels has a set fault-tolerance level (i.e., a number of failures that the RAID group can successfully recover from). As a result, the availability and resiliency of the storage system is very closely related to the RAID protection level utilized. For example, in RAID-1, the contents of a storage device are mirrored at another storage device. Since only half of the available space can be used for data, a RAID-1 protection configuration is typically very expensive to employ.

In the primary data storage it is necessary to maintain the integrity of the data. Thus, in the event of one or more errors, such as the failure of a physical disk, the failure of an individual data block, a checksum error, or other error, a recovery process enabled by the RAID level may be performed. The recovery process consumes significant amounts of time and system resources and prevents input/output operations from being performed on the primary data storage until the recovery process is complete. In addition, the recovery process is only possible if the number of failed disks or disk errors does not exceed the fault-tolerance level of the RAID group. If the number of failed disks or disk errors exceeds the fault tolerance level of the RAID group, the RAID group may stop operation and a system panic may be initiated.

The properties of RAID technology may be advantageous when used for secondary data storage, such as a cache. However, certain characteristics of RAID may be overly restrictive. For example, if an unrecoverable error condition exists, the storage system may take drastic recovery actions, such as a file system consistency check, to attempt to recover the data. However, a RAID array used as a cache could survive the failure of any number of storage devices since a copy of the cache contents already exists in the primary data storage. In addition, it may not be necessary to actively recover or reconstruct the contents of the cache, thus preventing downtime.

SUMMARY OF THE INVENTION

A storage server managing an array of storage devices implements techniques in order to continue operation despite disk failure or disk errors. The techniques allow the storage server, which may implement a RAID system on the storage devices, to continue operation and recover even if a number of disk failures and disk errors exceeds a fault tolerance level of the array.

The storage server receives a notification indicating a failure of a mass storage device in the storage array. The storage server determines whether a number of failures exceeds the fault tolerance level of the array and if the number of failures exceeds the fault tolerance level, recovers an address space corresponding to the failed storage device. When recovering the address space, the storage server replaces the failed storage device with a spare storage device having an identifiable pattern stored thereon and determines whether a file system on the storage system can automatically invalidate cached data blocks on the failed storage device.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

RAID-C management, according to the present invention, provides a method for operating a RAID array even in a scenario where the number of faults or errors in the RAID array exceeds the ability of the underlying RAID protection level to correct the error, thereby causing an unrecoverable error condition. For example, the following combinations of errors for RAID-4 may cause an unrecoverable error condition: one failed storage device and one media error on another storage device; one failed storage device and one checksum error on another storage device; two media errors in the same stripe; one media error and one checksum error in the same stripe; one media error and one missing block error; or the failure of more than one storage device. For a dual parity array having RAID-DP™, at least three errors or faults cause an unrecoverable error condition. As used herein, a "media error" occurs when a read operation is not successful due to the problems with the media on which the data reside. A "checksum error" occurs when a data integrity verification signature of a data block is failed. A "missing block error" takes place when the block range of the storage device that RAID attempts to read does not exist.

While an unrecoverable error condition may prevent operation of the primary storage in a storage system, a datastore which is serving as a cache, may not be rendered unusable by an unrecoverable error condition. In one embodiment, an array of storage devices (e.g., solid-state drives) serves as a cache for a storage system. In other implementations, the cache is a dedicated portion of the memory or a separate memory for preferably persistent or non-volatile storage. The array is organized using one of the RAID configurations such as RAID-0, RAID-1, RAID-4, RAID-5, RAID-DP™ or a combination of these RAID levels. In one embodiment, an array serving as a cache which implements the RAID techniques (referred to as "RAID-C") described herein, may continue operation when a number of errors exceeds the fault tolerance level of the underlying RAID level.

Figure 1:
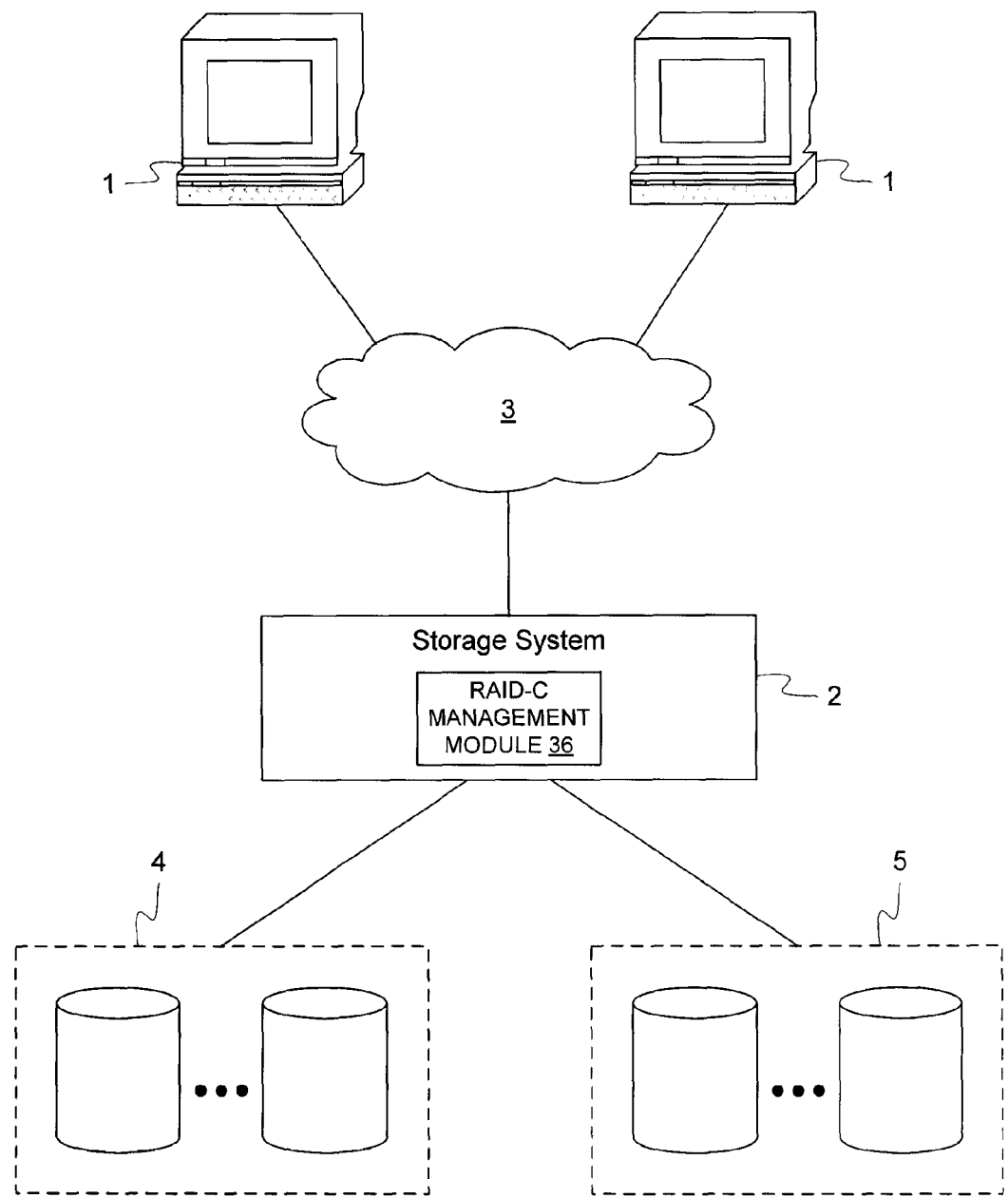
FIG. 1 is a block diagram illustrating a network environment including a storage system according to an embodiment.

FIG. 1 shows one embodiment of a network environment which incorporates a storage system 2 having a RAID-C management module 36 that implements a system and method of operating a traditional RAID array in a manner which allows it to tolerate any number of faults. The RAID array is formed using mass storage devices illustrated as first storage subsystem 4 and a second storage subsystem 5, coupled to storage system 2. The storage system 2 is also coupled to a set of storage clients 1 (hereinafter "clients") through a network 3. In the embodiment shown in FIG. 1, storage system 2 operates as a file server but the invention is not limited to use in traditional file servers. For example, the invention can be adapted for use in other types of storage systems, such as storage servers which provide clients with block-level access to stored data or processing systems other than storage servers. In one embodiment, storage subsystem 4 serves as the primary data storage for the storage system 2, while storage subsystem 5 serves as a secondary data storage or cache. The data contained in storage subsystem 5 may be replicated, for example, in storage system 4.

Figure 2:
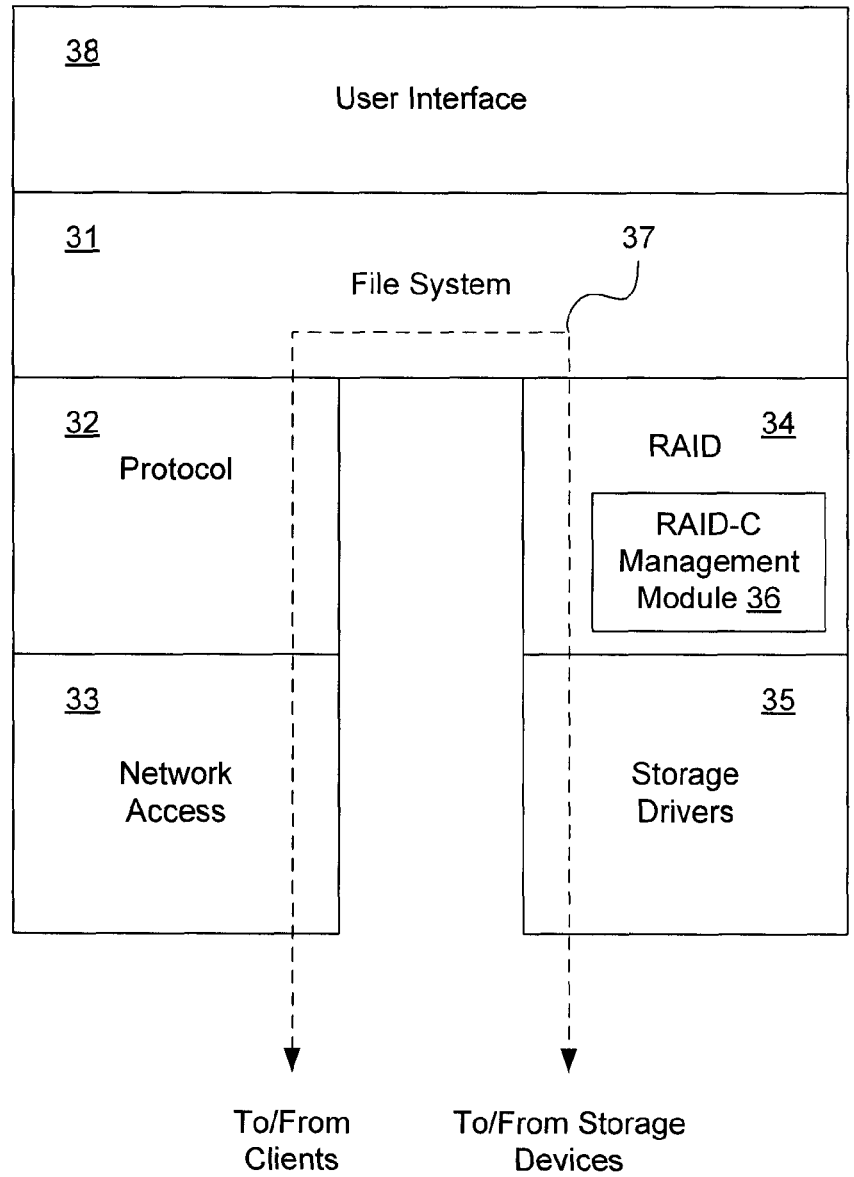
FIG. 2 is a block diagram illustrating the architecture of the operating system of the storage system according to an embodiment.

FIG. 2 shows an example of an operating system 24 executed by the storage system 2 of FIG. 1. As shown, the operating system 24 includes several modules, or "layers." These layers include a file system 31, which may include software, executed by a processor in storage system 2, that imposes a hierarchy (e.g., a directory/file structure) on the data stored in the storage subsystem 4 and manages read/write operations on the data (i.e., executes read/write operations on the disks in response to client requests). The operating system 24 also includes a protocol layer 32 and an associated network access layer 33, to allow the storage system 2 to communicate over the network 3 (e.g., with clients 1).

The operating system 24 also includes a storage access layer 34 and an associated storage driver layer 35, to allow the storage system 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-0, RAID-1, RAID-4, RAID-5 or RAID-DP™, and therefore it is alternatively called the "RAID layer" 34.

Also shown in FIG. 2 is the path 37 of data flow, through the operating system 24, associated with a read or write operation. The operating system 24 also includes a user interface 38 to generate a command line interface (CLI) and/or graphical user interface (GUI), to allow administrative control and configuration of the storage system 2, from a local or remote terminal.

As illustrated in FIG. 2, in one embodiment, the RAID-C management module 36 is part of the RAID layer 34. RAID layer 34 is configured to detect errors or faults in an address space corresponding to an attached array of storage devices and to notify RAID-C management module 36 upon determination that the underlying array suffered an unrecoverable error condition; that is, RAID layer 34 is unable to continue operating or is unable to recover the data blocks which sustained the error due to the number of errors exceeding the current fault tolerance level of the RAID layer 34. RAID-C management module 36, in turn, is responsible for making sure that the array remains operational, and for marking data blocks that cannot be correctly addressed due to sustained errors or faults as invalid. As will be described in more detail herein, module 36 sets a cache-miss indicator (such as a flag or a bit value) within a close proximity to the data block that sustained the unrecoverable error. As used herein, setting a cache-miss indicator within a close proximity to the data block means that when an I/O request is issued to a data block, the cache-miss indicator will also be read as part of the same I/O. In one embodiment, the cache-miss indicator is written in the checksum area adjacent to the data block.

Module 36 is further adapted to write an identifiable bit pattern to the data blocks that encountered unrecoverable error conditions. When a media error occurs on a storage device, the storage device cannot provide the data stored on the media. As a result, the storage system needs to write some information to correct the data blocks with an unrecoverable error. Writing such an identifiable bit pattern, in one implementation, may include writing "zeroes" to the data blocks or other information to analyze origins of the error.

In RAID-4, RAID-5, and RAID-DP™, a data protection value (e.g., redundant parity) is calculated and is stored at various locations on the storage devices. Parity may be computed as an exclusive-OR (XOR) operation of data blocks in a stripe spread across multiple storage devices in an array. In a single parity scheme, e.g. RAID-4 or RAID-5, an error can be corrected in any block in the stripe using a single parity block (also called "row parity"). In RAID-DP™, errors resulting from the failure of two-storage devices can be corrected using two parity blocks: a row parity block, and a diagonal parity block. Thus, module 36 is also configured to re-compute parity since new data (i.e., the pattern) are written to the data blocks. Re-computing parity in the stripe provides the following advantage. If any new errors were to develop in that stripe, those errors would be recoverable. If the parity were not recomputed, even a single new error in the stripe becomes unrecoverable.

Module 36 is also responsible for parity-protecting the cache-miss indicator in a stripe where the unrecoverable errors occurred. Advantageously, parity protecting the cache-miss indicator in a stripe where the bad data blocks reside or mirroring the cache-miss indicator if the underlying RAID protection layer is RAID-1 (e.g., writing the mirrored cache-miss indicator within the close proximity to the mirrored data block) ensures that the RAID system will be able to "remember" that the bad data blocks in a stripe sustained an unrecoverable error even if the device where the bad data blocks resides fails and is reconstructed to a replacement.

The RAID-C management module 36 may implement the methods for protecting a secondary data storage as further described below in conjunction with FIGS. 4A-6. In one embodiment, RAID-C management module 36 is operative to communicate with file system layer 31 for retrieving a logical volume block number (VBN) from a layout data structure and passing the retrieved logical VBN to storage layer 34. Storage layer 34 maps the logical VBN to a disk block number (DBN) and sends the DBN to an appropriate driver (e.g. SCSI) of storage driver layer 35. The disk driver accesses the DBN from the storage devices and loads the requested data block(s) in memory 224 for processing by the storage server. When a client sends a data storage request to the storage server, data may be written to the disks in accordance with a layout generated by RAID layer 34. In one embodiment, when the storage server receives a data storage request from the client (e.g., a request to write data to the mass storage devices), the request is held and aggregated with a number of other requests which are all written to disk at a later time, such as for example at a consistency point.

Figure 3:
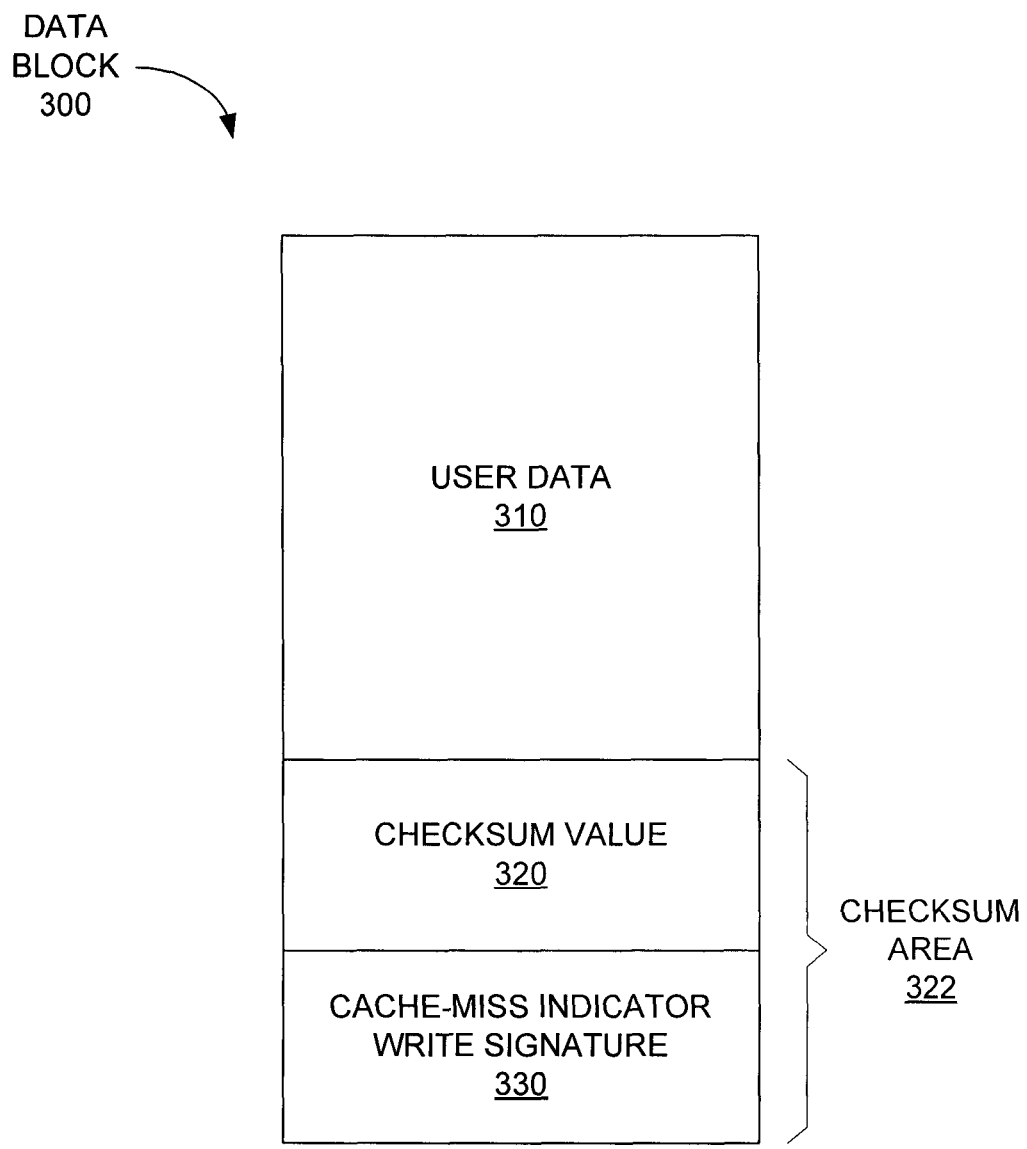
FIG. 3 is a block diagram illustrating a data block of the storage system according to an embodiment.

FIG. 3 is a block diagram illustrating a data block of the storage system according to an embodiment of the present invention. An exemplary data block 300 is shown, which includes section 310 where client data or metadata is stored. In one embodiment data block 300, may have a size of 4096 bytes. Data block 300 also includes a checksum area 322, which, in one implementation, is adjacent to section 310. The checksum area may occupy, for example, 64 bytes. The checksum area stores a checksum value, which is computed from the data 310 in the data block for the purpose of detecting errors that might have occurred during data transmission or during storage of the data block. When data is written to a storage device, such as disk, a checksum value is computed and is stored in the checksum area. When the data is read, the integrity of the data is checked by re-computing the checksum and comparing it with the stored one. If the newly computed checksum and the stored checksum do not match, the data is considered to be corrupted. In one embodiment, the checksum area 322 has two sections (each may have a size of 32 bytes). In one embodiment, the first section 320 stores the checksum value. The first section may also contain a volume block number (VBN). In one embodiment, the second section 330 stores a write signature. The write signature or a write verification signature is used to detect a lost-write error or a missing error. A lost-write error, in turn, refers to an error condition where the storage device acknowledges a successful write completion for both the data and the checksum of a data block, when in fact the write operation is not committed to a storage device. The write signature stamps a unique signature for every write operation. RAID system verifies the write signatures to detect lost writes. The write signature is computed, in one embodiment, using the following information provided by the file system an identification (ID) of a data container (such as a file) stored at a storage device, a block number (such as VVBN), and a consistency point (CP) count. CP count refers to the count of the consistency point and in one embodiment can be stored in the second 32 byte section of the checksum area. Furthermore, in one embodiment, the checksum area includes a cache-miss indicator specifying if a data block sustained an unrecoverable error. According to embodiments described herein, the cache-miss indicator can be cleared if the error recovery was successful and an accurate and complete copy of the bad data block was obtained. In another embodiment, the cache-miss indicator can also be cleared if a new block is written at the same address.

Figure 4A:
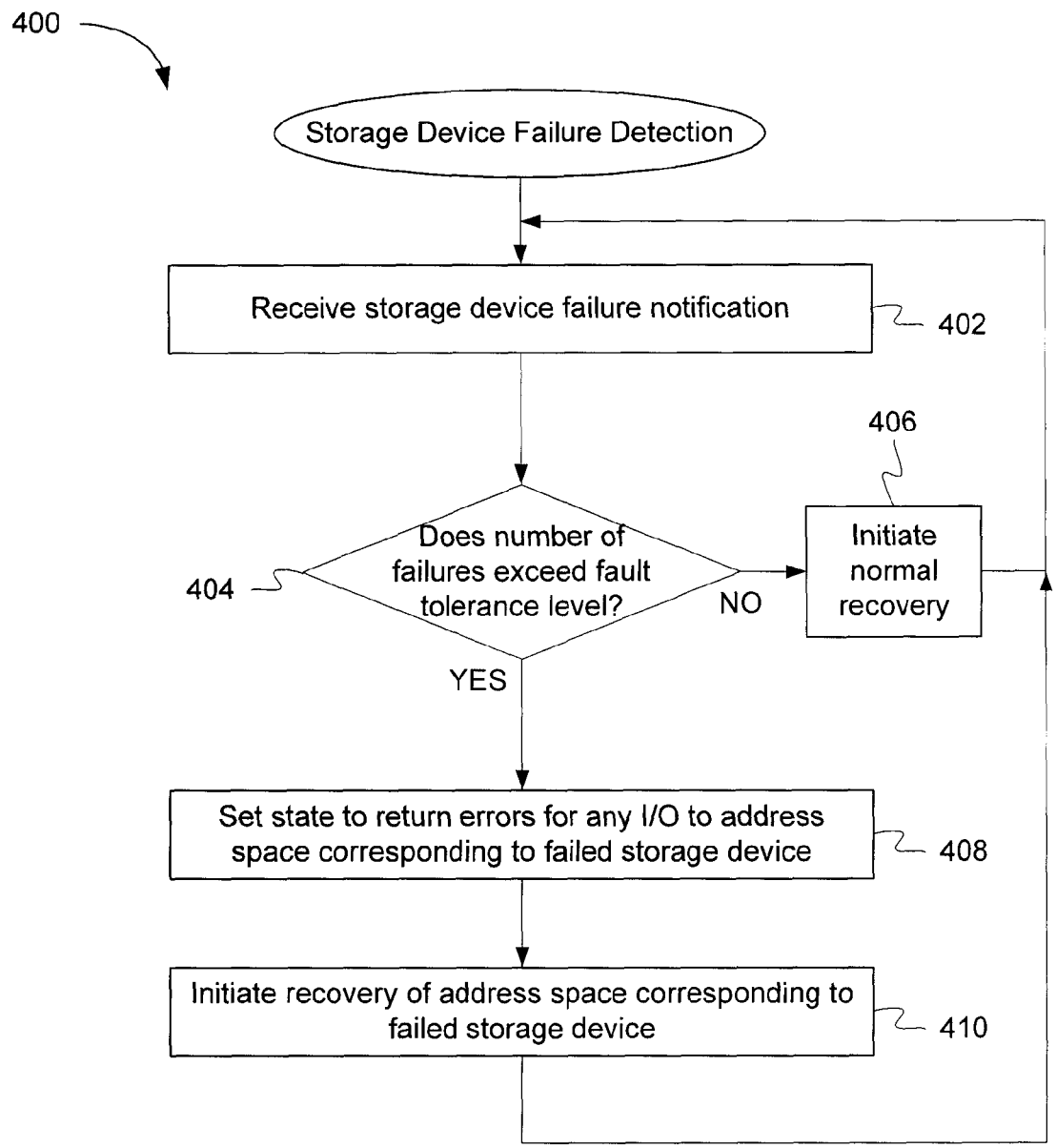
FIG. 4A is a flow chart illustrating a method for detection and handling of a failed storage device according to an embodiment.

FIG. 4A is a flow chart illustrating a method for detection and handling of a failed storage device according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 is performed by the RAID-C management module 36 of storage system 2. In this embodiment, method 400 is a method for detecting the failure of a storage device (e.g., a disk) in an array of storage devices 5 used as cache storage. In one embodiment, the storage device is a disk, although those skilled in the arty would understand that any form of storage media may be used. At block 402, method 400 receives notification of storage device failure in the array. The failure may be detected and communicated by storage drivers 35 according to known failure detection techniques.

At block 404, method 400 determines whether the storage device failure causes the number of failures in the array to exceed the fault tolerance level of the array 5. For example, if the underlying RAID level of the array 5 is RAID-4 or RAID-5, the fault tolerance level is one. The number of storage device failures detected, as well as the fault tolerance level of the array, may be stored in a data structure (not shown) managed by RAID layer 34. The number of storage device failures detected is compared to the fault tolerance level and if the number of failures does not exceed the fault tolerance level, at block 406, method 400 recovers from the error according to known storage device reconstruction techniques. The details of this and other known recovery techniques are not germane to the invention and thus are not described herein.

If at block 404, method 400 determines that the number of storage device failures does exceed the fault tolerance level of the array, it is said that an unrecoverable error condition is encountered. When an unrecoverable error condition is encountered, rather than take drastic recovery actions such as a file system consistency check, method 450 takes action in accordance with RAID-C techniques. At block 408, method 400 sets a state of RAID-C management module 36 to return errors for any I/O operation directed to the address space corresponding to the failed storage device. Thus any data access requests received at network access layer 33 and processed by file system 31 will cause RAID-C management module 36 to return an error message to the requesting client device. At block 410, method 400 initiates recovery of the address space corresponding to the failed storage device detected at block 402 until recovery is complete. Details of the recovery method will be described below with respect to FIG. 4B.

Figure 4B:
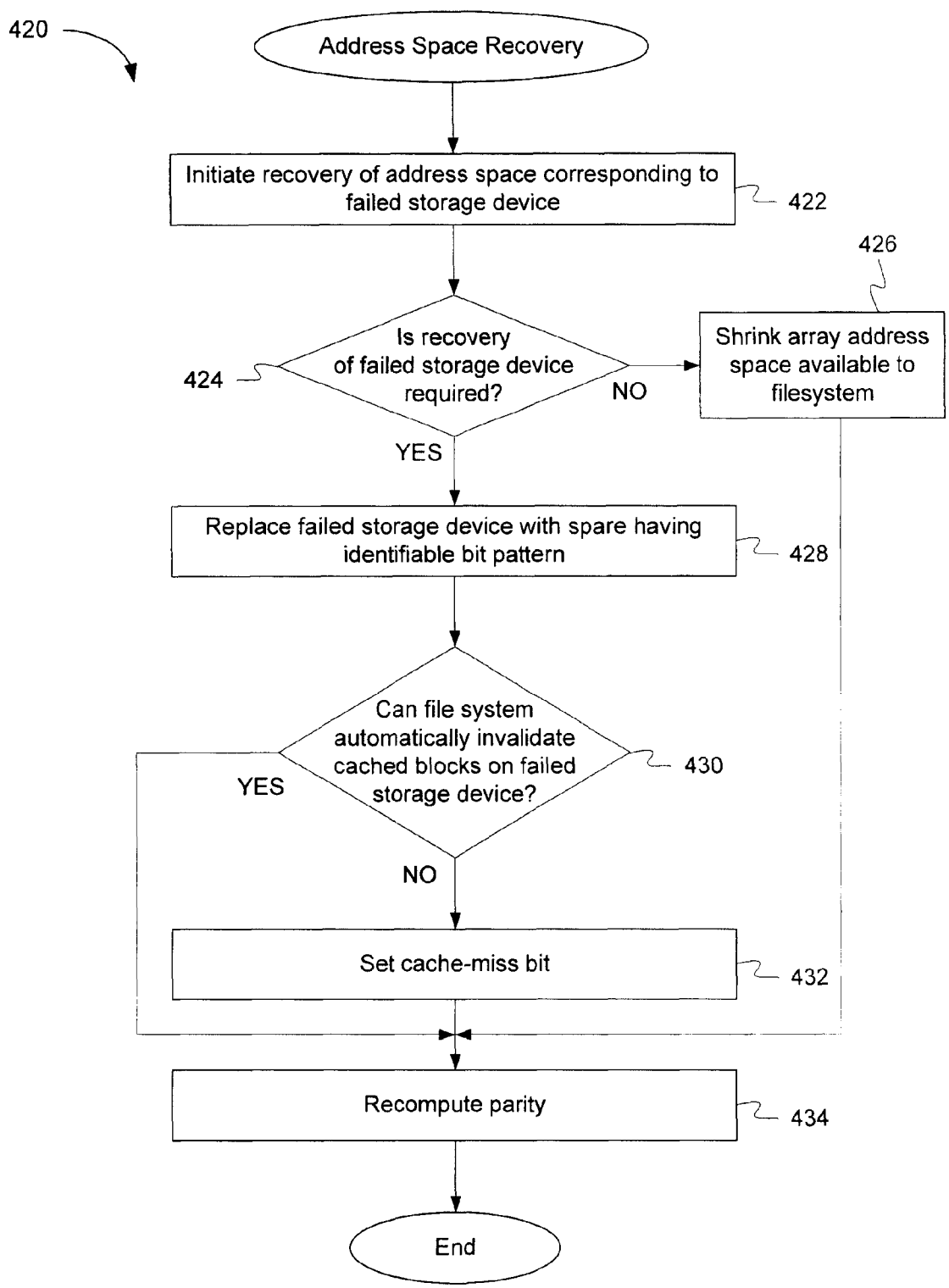
FIG. 4B is a flow chart illustrating a method for recovery of the address space of a failed storage device according to an embodiment.

FIG. 4B is a flow chart illustrating a method for recovery of the address space of a failed storage device according to an embodiment. The method 420 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 420 is performed by the RAID-C management module 36 of storage system 2. In this embodiment, method 420 is a method for recovering the address space of a failed storage device (e.g., a disk) in an array of storage devices 5 used as cache storage.

At block 422, the recovery method 420 is initiated. The method 420 may be initiated by RAID-C management module 36 in response to the detection of a failed storage device, as described above with respect to FIG. 4A. At block 424, method 420-determines whether recovery of the failed storage device is required. For example, because the RAID-C methods are used with cache storage, recovery of the failed storage device may not be necessary because another copy of the data may exist, for example in primary storage. RAID-C management module 36 may maintain a data structure which indicates whether each storage device in the array 5 should be recovered. The data structure may have configurable parameters to determine whether to initiate recovery of each storage device. If at block 424, method 420 determines that recovery of the failed storage device is not required, at block 426, method 420 may shrink the address space to that provided by the remaining storage devices by disallowing access of file system 31 to the address space corresponding to the failed storage device. RAID-C management module 36 may issue a command to file system 31 indicating that the address space corresponding to the failed storage device is no longer available.

If at block 424, method 420 determines that recovery of the failed storage device is required, method 420 proceeds to block 428. At block 428, method 400 replaces the failed storage device with a spare storage device containing an identifiable bit pattern. In one embodiment, the identifiable pattern includes all zeroes. In one embodiment, the spare storage device may be a storage device (i.e., an SSD) which is already coupled to and known by the system (i.e., a hot spare) and is activated by storage driver layer 36 according to known techniques.

At block 430, method 400 determines if file system 31 can automatically invalidate cached blocks on the failed storage device. In one embodiment, file system 31 keeps track of blocks on a per-disk basis. For each block, file system 31 maintains a system indicating the current status of the block (i.e., functional or failed). The system may be for example a flag or bit value, similar to the cache-miss bit used by the RAID layer. In response to receiving an indication that the storage device has failed, file system 31 may mark each block corresponding to that storage device as failed. If file system 31 can automatically invalidate the blocks on the failed storage device, at block 434, method 420 re-computes the parity for the array including the newly added spare storage device if the array is parity protected.

If at block 430, method 420 determines that file system 31 cannot automatically invalidate blocks on the failed storage device, method 420 proceeds to block 432. At block 432, method 420 marks the cache-miss bit 330 in the checksum area 322 of data blocks on the replacement spare storage device. In one embodiment, the cache-miss bit is stored within a close proximity of the data block, e.g., if the storage device is a disk, the indicator can be stored within the next several bytes. Storing a cache-miss indicator within a close proximity of the data block ensures that when an I/O request is sent to read a data block, the cache-miss indicator is also read as part of the same I/O without incurring an additional I/O to the storage devices. At block 434, method 420 re-computes the parity for the array, including the newly added spare storage device, which may or may not have the cache-miss bit set.

Figure 4C:
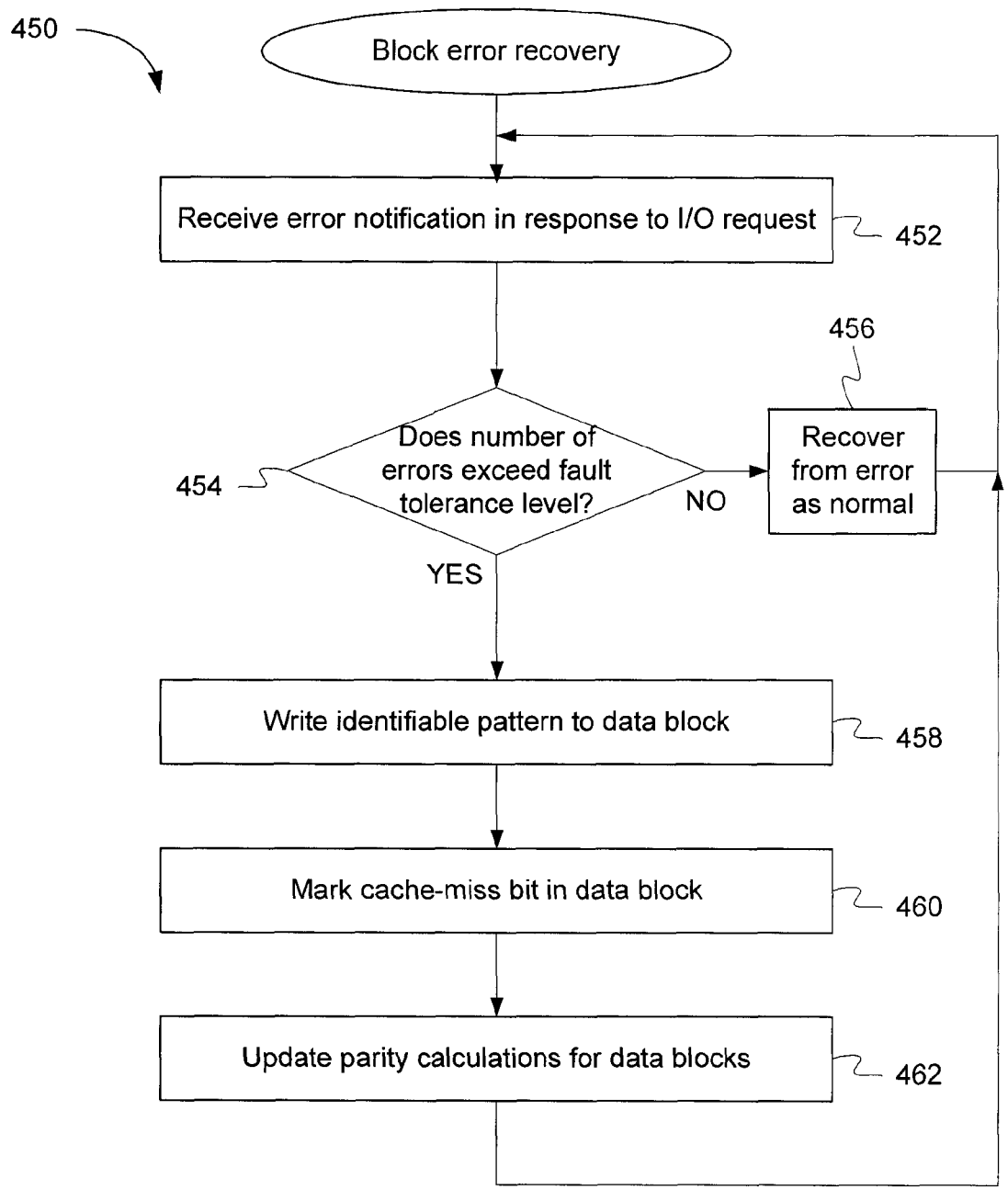
FIG. 4C is a flow chart illustrating a method for block error recovery according to an embodiment.

FIG. 4C is a flow chart illustrating a method for block error recovery according to an embodiment. The method 450 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 450 is performed by the RAID-C management module 36 of storage system 2. In this embodiment, method 450 is a method for recovering from a block error in an array of storage devices 5 used as cache storage.

At block 452, method 450 receives a communication from the storage driver module, such as module 35 in FIG. 2, indicating that an error was encountered in response to an I/O request. The error may be for example a media error, a checksum error, or a missing block error. The error may be detected by RAID layer 34 according to known error detection techniques. Alternatively, the error may be triggered as a result of reading a block from a failed storage device or from a reconstructed storage device where the block being read has not yet been recovered. At block 454, method 450 determines whether the detected error causes the number of errors in the stripe corresponding to the block to exceed the fault tolerance level of the stripe. The fault tolerance level of the stripe is typically the same as that of the array, however, in some embodiments, the fault tolerance levels may be different. For example, if the underlying RAID level of the array 5 is RAID-4 or RAID-5, the fault tolerance level is one. The number of errors detected, as well as the fault tolerance level of the array, may be stored in a data structure managed by RAID layer 34. In one embodiment, the number of errors in a stripe refers to both individual block errors (e.g., media or checksum errors) and missing storage devices. The number of errors detected is compared to the fault tolerance level and if the number of errors does not exceed the fault tolerance level, at block 456, method 450 recovers from the error according to known block recovery techniques. In the example of RAID-4 or RAID-5, method 450 examines the remaining blocks in the stripe, including the block on a parity disk and is able to reconstruct the failed block. The details of this and other known recovery techniques are not germane to the invention and thus not described herein.

If at block 454, method 450 determines that the number of errors does exceed the fault tolerance level of the array, it is said that an unrecoverable error condition is encountered. When an unrecoverable error condition is encountered, rather than take drastic recovery actions such as a file system consistency check, method 450 takes action in accordance with RAID-C techniques. At block 458, method 450 writes an identifiable pattern to the data blocks which encountered the unrecoverable error condition. The identifiable pattern may overwrite the data currently stored in the data block. In one embodiment, the identifiable pattern may include all zeroes. At block 460, method 450 marks the cache-miss bit in the data blocks that encountered the unrecoverable error condition. In one embodiment, the cache-miss bit is stored within a close proximity of the data block, e.g., if the storage device is a disk, the indicator can be stored within the next several bytes. Storing a cache-miss indicator within a close proximity of the data block ensures that when an I/O request is sent to read a data block, the cache-miss indicator is also read as part of the same I/O without incurring an additional I/O to the storage devices. At block 462, method 450 re-computes the parity for the stripe which includes the data block that encountered the unrecoverable error condition. In one embodiment, the parity may be computed by an exclusive-OR (XOR) operation, where the resulting value is stored in one block in the stripe. In one embodiment, the cache-miss bits for each data block in the stripe may also be parity protected in a manner similar to the data blocks themselves. In such a case, the parity for the cache-miss bits may also be re-computed at block 462.

Figure 5:
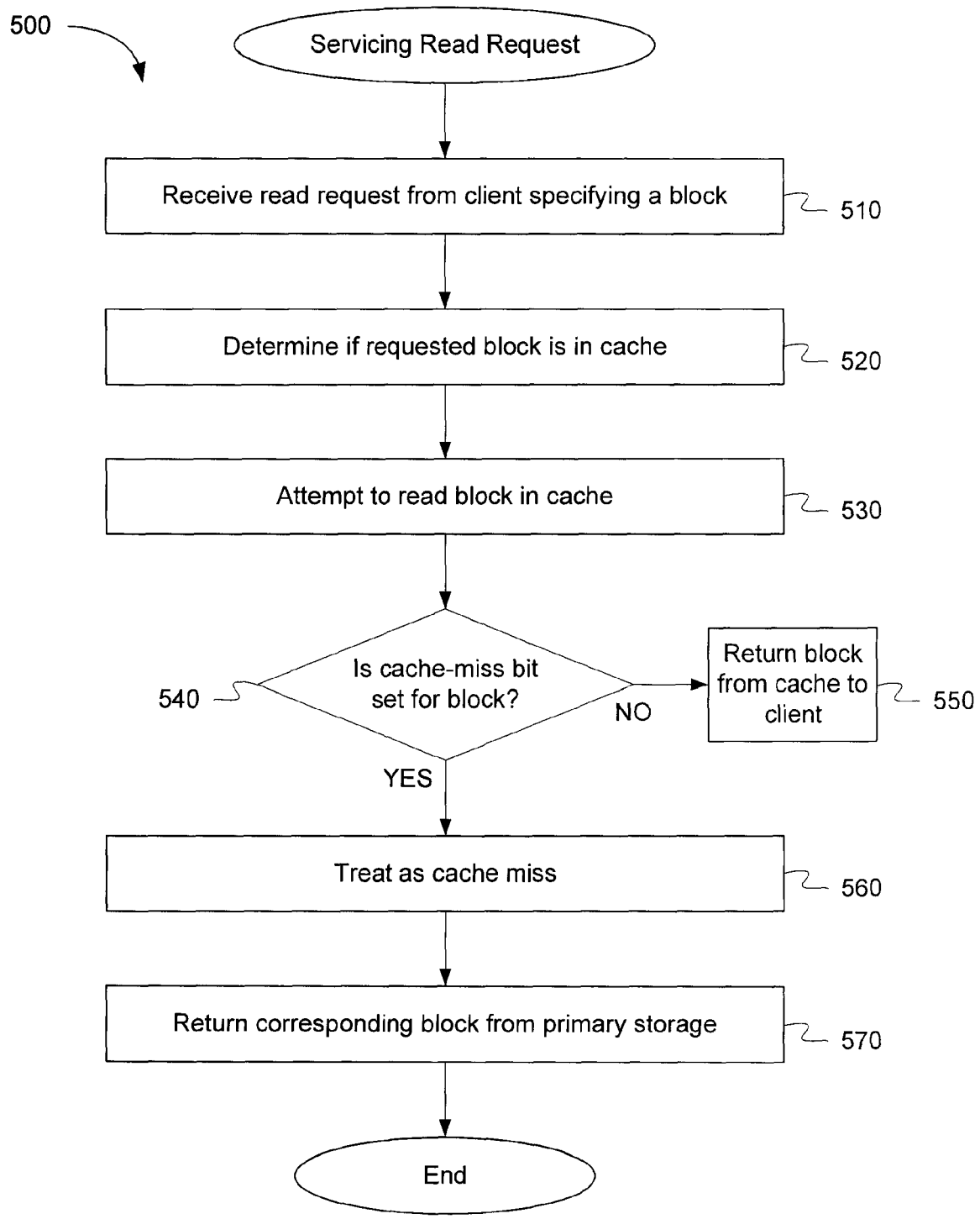
FIG. 5 is a flow chart illustrating a method for servicing a read request according to an embodiment.

FIG. 5 is a flow chart illustrating a method for servicing a read request according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 500 is performed by the RAID-C management module 36 of storage system 2 of FIG. 1. In this embodiment, method 500 is a method for servicing a read request made by a client 1 of storage system 2.

At block 510, method 500 receives a read request specifying a data block. The requested data block may be specified by a block address or other unique identifier. At block 520, method 500 determines if a corresponding copy of the requested block is present in secondary storage or cache. Method 500 may check an in-memory data structure which identifies the blocks currently stored in the cache. At block 530, method 500 attempts to read the requested block from the cache.

During the read process, method 500 also reads the cache-miss bit associated with the requested data block. The cache-miss bit may be set to indicate that the data block in the cache suffered an error as described above with respect to FIG. 4C. Alternatively, the cache-miss bit may be set to indicate that the contents of the storage device on which the block was stored may not be recovered successfully, as described above with respect to FIG. 4B. At block 540, method 500 determines whether the cache-miss bit is set for the requested data block. If the cache-miss bit is not set, at block 550, method 500 returns the contents of the requested data block from the cache to the client. If at block 540, method 500 determines that the cache-miss bit is set for the requested data block, at block 560, method 500 treats the read request as a cache-miss and returns an error signal to filesystem layer 31. At block 570, method 500 retries the requested data block from the corresponding location in primary storage 4 and returns the contents to the client 1.

Figure 6:
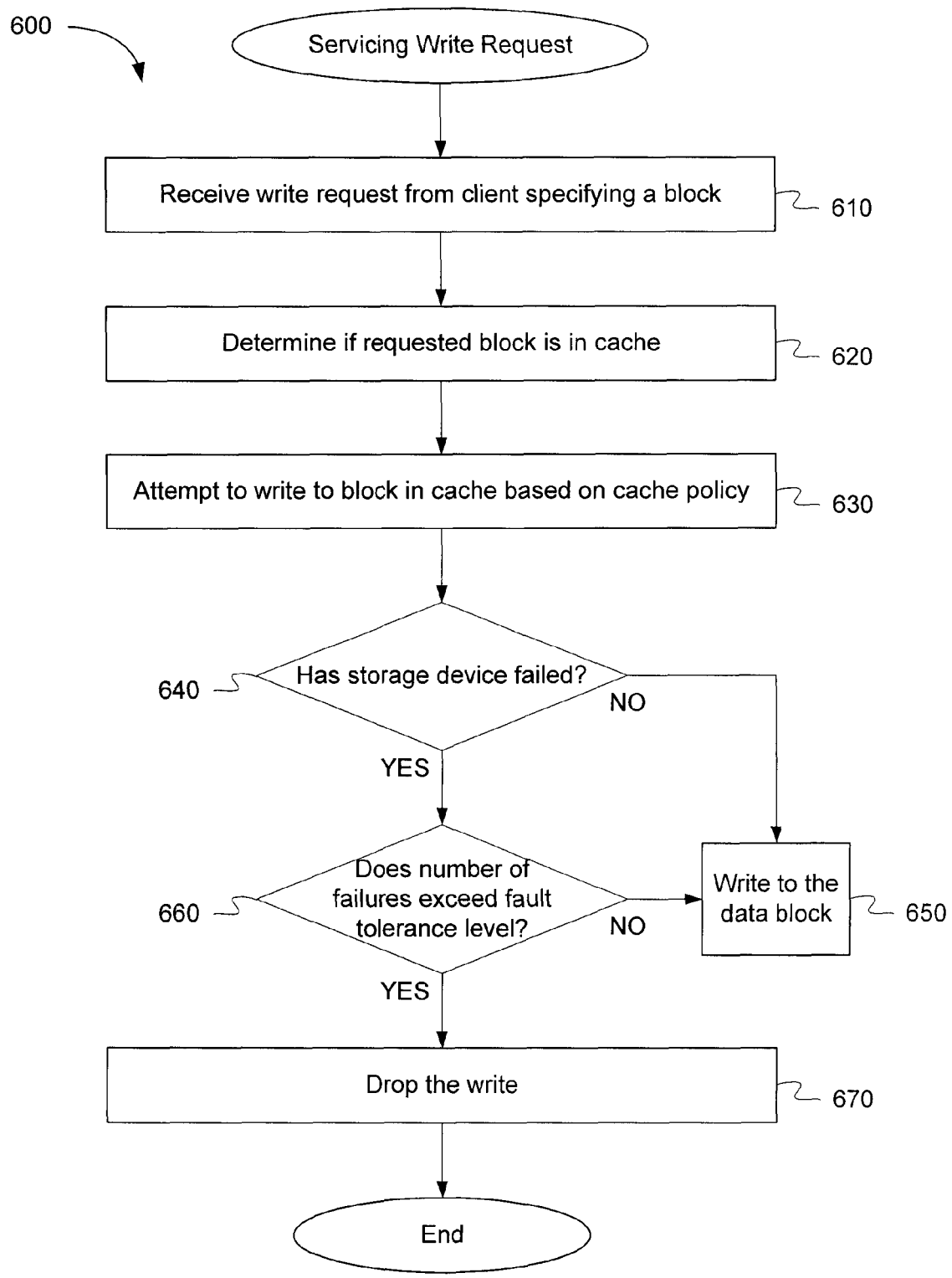
FIG. 6 is a flow chart illustrating a method for servicing a write request according to an embodiment.

FIG. 6 is a flow chart illustrating a method for servicing a write request according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 600 is performed by the RAID-C management module 36 of storage system 2 of FIG. 1. In this embodiment, method 600 is a method for servicing a write request made by a client 1 of storage system 2.

At block 610, method 600 receives a write request specifying a data block. The requested data block may be specified by a block address or other unique identifier. At block 620, method 600 determines if a corresponding copy of the requested block has to be stored in the secondary storage, which is serving as a cache. Method 600 may check and update a data structure which identifies the blocks currently stored in the cache. The data structure may be in memory or in a persistent storage and may be maintained by File System layer 31, as shown in FIG. 2.

At block 630, method 600 attempts to write to the requested block in the cache by examining a cache policy. The cache policy may be implemented by RAID-C management module 36 and may determine which blocks are written to cache based on any of a number of algorithms (e.g., write-through, write-back).

At block 640, method 600 determines whether the storage device on which the block identified in the write request has suffered a failure. The failure of a storage device may be determined according to method 400 described above with respect to FIG. 4A. If the failed storage device has been recovered according to method 400 or 420 described above with respect to FIGS. 4A and 4B, the write is directed to a region of a recovering/reconstructing storage device which has already been recovered, or the storage device being written to has not suffered a failure, at block 650, method 600 performs the write operation on the requested data block using the normal write algorithm used by the RAID array. In one embodiment, the write process may include reading from other drives to help compute parity. If these reads encounter an unrecoverable error condition, then the block error recovery method of FIG. 4C may be invoked to repair these errors and the write request is re-processed. If the storage device has suffered a failure and has not been reconstructed, or if the write is directed to a region of a reconstructing storage device which has not already been recovered, at block 660, method 600 determines whether a number of failures in the array exceeds the fault tolerance level of the array. The number of storage device failures detected, as well as the fault tolerance level of the array, may be stored in a data structure managed by RAID layer 34. The number of storage device failures detected is compared to the fault tolerance level and if the number of failures does not exceed the fault tolerance level, the write operation is performed in the normal manner at block 650. If it is determined that the number of storage device failures does exceed the fault tolerance level of the array, at block 670, method 600 drops the write. When the write is dropped it is not committed to any storage medium, either the cache or the primary storage and is treated as if the write request were never received. Dropping the write is not harmful since the block would have to be recovered via the address space recovery method described above with respect to FIG. 4B. In another embodiment, if there exists a mechanism to track individual blocks which have been written subsequent to a storage device failure, but before reconstruction, then instead of dropping writes, it is possible to perform the write using the normal approach at block 650. Under the normal approach, the data specified in the write request is committed to the storage device being used as a cache using conventional write techniques.

Figure 7:
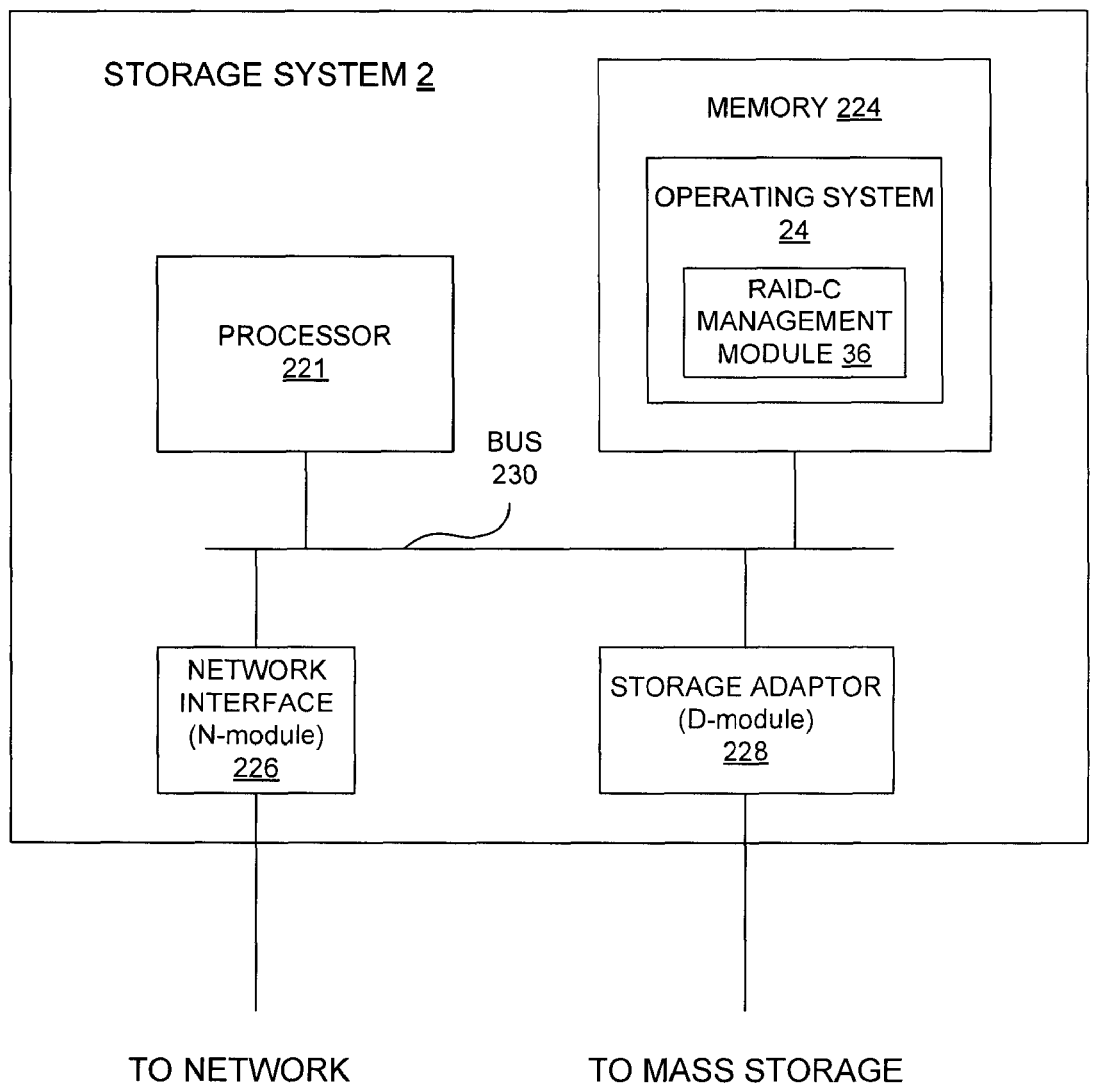
FIG. 7 is a block diagram illustrating a hardware architecture of a storage system according to an embodiment.

FIG. 7 illustrates a schematic block diagram of one embodiment of the storage system 2. The storage system 2 includes a processor 221, a memory 224, a network interface 226, and a storage adaptor 228, which are coupled to each other via a bus system 230. The bus system 230 may include one or more busses and/or interconnects. The storage system 2 communicates with a network via the network interface 226, which may be an Ethernet adaptor, fiber channel adaptor, etc. The network interface 226 may be coupled to a public network, a private network, or a combination of both in order to communicate with a client machine usable by an administrator of the remote data storage system.

The storage system 2 may have a distributed architecture; for example, it may include a separate network element or module (an "N-module") and disk element or module ("D-module") in place of the network interface 226 and the storage adaptor 228. In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Alternatively, the storage system 2 may have an integrated architecture, where the network and data components are all contained in a single box. The storage system 2 may be further coupled through a switching fabric to other similar storage systems (not shown) which have their own local storage subsystems. In this way, all of the storage subsystems can form a single storage pool, to which any client of any of the storage systems has access.

In one embodiment, the processor 221 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 24. The processor 221 retrieves the instructions from the memory 224 to run the operating system 24. In one embodiment operating system 24 includes RAID-C management module 36, which will be described further below. The storage system 2 may interface with one or more storage systems via the storage adaptor 228, which may include a small computer system interface (SCSI) adaptor, fiber channel adaptor, etc.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In particular, FIG. 1 is intended to provide an overview of the operating environment in which the described RAID-C management may be practiced. Network 3 which may be a local area network (LAN), a metropolitan area network (MAN), a wide area network (WAN), a global area network (GAN) such as the Internet, a Fibre Channel fabric, or a combination of such networks. Each of the clients 1 may be, for example, a conventional personal computer (PC), a server-class computer, workstation, handheld computing or communication device, or other special or general purpose computer. The first storage subsystem 4 and the second storage subsystem 5 are managed by the storage system 2. The storage system 2 receives and responds to various read and write requests (i.e., I/O requests) from the clients 1, directed to data stored in or to be stored in the storage subsystems. The mass storage devices in the storage subsystems may be, for example, conventional magnetic disks, optical disks such as CD-ROM or DVD based storage, magneto-optical (MO) storage, or any other type of non-volatile storage devices suitable for storing large quantities of data. In one embodiment, the mass storage devices in the storage subsystems are flash-based solid-state devices (SSDs), sometimes known as flash drives. In one embodiment, storage subsystem 4 serves as the primary data storage for the storage system 2, while storage subsystem 5 serves as a secondary data storage or cache.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
receiving, by a storage system, a notification indicating a failure of a storage device in a cache storage array for caching data;
determining whether a number of failures exceeds a fault tolerance level of the cache storage array; and
if the number of failures exceeds the fault tolerance level, recovering an address space corresponding to the failed storage device, wherein recovering the address space comprises:
replacing the failed storage device with a spare storage device having an identifiable pattern stored thereon;
determining whether a file system on the storage system can automatically invalidate cached data blocks on the failed storage device;
if the file system cannot automatically invalidate cached data blocks on the failed storage device, setting an indicator for each of a plurality of data blocks on the spare storage device, wherein the indicator indicates that an associated data block has an unrecoverable error, and wherein the associated data block contains the identifiable pattern; and
updating a parity calculation for a stripe of data blocks in the storage system, wherein the stripe of data blocks includes a data block on the spare storage device, and wherein the data block on the spare storage device contains the identifiable pattern.

2. The method of claim 1, further comprising:
if the number of failures exceeds the fault tolerance level, returning an error message in response to an input/output request for the address space corresponding to the failed mass storage device.

3. A method, comprising:
receiving, by a storage system, a data access request for a data block in an array of cache storage devices connected to the storage system, the cache storage device containing data replicated in a primary storage device;
determining a data block has an unrecoverable error, wherein the data block has an unrecoverable error if a number of errors in a stripe of data blocks across the array of cache storage devices exceeds a number of errors that can be corrected by an underlying RAID protection level;
setting a cache-miss indicator bit associated with the data block in response to determining the data block has an unrecoverable error;
writing an identifiable pattern to the data block in response to determining the data block has an unrecoverable error;
updating a parity calculation for a stripe of data blocks in the storage system, wherein the parity calculation includes the data block with the identifiable pattern; and
continuing to service data access requests without initiating a consistency check operation in the storage system.

4. The method of claim 3, wherein the array of storage devices comprises an array of solid state drives (SSDs).

5. A system comprising:
an array of cache storage devices;
a storage server coupled to the array of cache storage devices, the storage server comprising;
a storage access module configured to detect a failure of a storage device in the array of cache storage devices and to determine whether a number of failures exceeds a fault tolerance level of the array; and
a RAID-C management module configured to recover an address space corresponding to the failed storage device if the number of failures exceeds the fault tolerance level, wherein recovering the address space comprises:
replacing the failed storage device with a spare storage device having an identifiable pattern stored thereon;
determining whether a file system on the storage system can automatically invalidate cached data blocks on the failed storage device;
if the file system cannot automatically invalidate cached data blocks on the failed storage device, setting an indicator for each of a plurality of data blocks on the spare storage device, wherein the indicator indicates that an associated data block has an unrecoverable error, and wherein the associated data block contains the identifiable pattern; and
updating a parity calculation for a stripe of data blocks in the storage system, wherein the stripe of data blocks includes a data block on the spare storage device, and wherein the data block on the spare storage device contains the identifiable pattern.

6. The system of claim 5, wherein the RAID-C management module is further configured to:
return an error message in response to an input/output request for the address space corresponding to the failed mass storage device if the number of failures exceeds the fault tolerance level.

7. A system, comprising:
a primary array of mass storage devices;
a cache array of mass storage devices containing data replicated in the primary array of mass storage devices; and
a storage server coupled to the primary and cache arrays of mass storage devices, the storage server comprising:
a storage access module that maintains a data protection mechanism, wherein the storage access module is configured to identify, during a data access request, a data block in the cache array of mass storage devices having an unrecoverable error condition, wherein the data block has an unrecoverable error if a number of errors in a stripe of data blocks across the cache array of mass storage devices exceeds a number of errors that can be corrected by an underlying RAID protection level; and
a RAID-C management module configured to:
write an identifiable pattern to the data block having the unrecoverable error;
set an indicator bit for th data block having the unrecoverable error condition, wherein the storage access module continues to service data access requests even if the indicator bit is set; and
updating a parity calculation for a stripe of data blocks in the storage array, wherein the stripe of data blocks includes the block with the identifiable pattern.

* * * * *